(12) United States Patent
Day (10) Patent No.: US 10,156,736 B2
(45) Date of Patent: Dec. 18, 2018

(54) COLORED CONTACT LENSES AND METHOD OF MAKING THE SAME (71) Applicant: Novartis AG, Basel (CH)

(72) Inventor: Ellen A. Day, Alpharetta, GA (US)

(73) Assignee: Novartis AG, Basel (CH)

(*) Notice: Subject to any disclaimer, the term of this patent is extended or adjusted under 35 U.S.C. 154(b) by 0 days.

(21) Appl. No.: 15/486,642

(22) Filed: Apr. 13, 2017

(65) Prior Publication Data
US 2018/0299698 A1  Oct. 18, 2018

(51) Int. Cl.
G02C 7/04 (2006.01)
G02C 7/10 (2006.01)
B29D 11/00 (2006.01)
B29K 83/00 (2006.01)
B29K 105/00 (2006.01)

(52) U.S. Cl.
CPC ........ G02C 7/046 (2013.01); B29D 11/00903 (2013.01); G02C 7/105 (2013.01); B29D 11/00038 (2013.01); B29K 2083/00 (2013.01); B29K 2105/0061 (2013.01); B29K 2995/0021 (2013.01)

(58) Field of Classification Search
CPC ... G02C 7/046; G02C 7/105; B29D 11/00903
USPC .................................................. 351/159.25
See application file for complete search history.

(56) References Cited

U.S. PATENT DOCUMENTS

| 3,536,386 A | 10/1970 | Spivack |
| 3,679,504 A | 7/1972 | Wichterle |
| 3,712,718 A | 1/1973 | Legrand et al. |
| 4,444,711 A | 4/1984 | Schad |
| 4,460,523 A | 7/1984 | Neefe |
| 4,460,534 A | 7/1984 | Boehm et al. |

(Continued)

FOREIGN PATENT DOCUMENTS

| EP | 0472496 A2 | 2/1992 |
| EP | 0309154 B1 | 6/1994 |

(Continued)

OTHER PUBLICATIONS

Matsuda et al. "Clinical Comparison of Corneal Diameter and Curvature in Asian Eyes with Those of Caucasian Eyes", Optometry & Vision Science, 1992, vol. 69, No. 1, pp. 51-54.

Primary Examiner — James Greece
(74) Attorney, Agent, or Firm — Sheng-Hsin Hu (57) ABSTRACT The invention is directed to a colored contact lens designed for making a wearer's eyes to appear larger and more defined and with more shine, while remaining natural by blending seamlessly with the eye. A colored contact lens, comprising a first print of a first color and a second print of a second color, wherein the first print is an annular ring of gradient dot matrix, wherein the second print is an annular ring of speckle pattern, wherein the annular ring of speckle pattern comprises clusters of regular or irregular shapes distributed annularly, wherein the regular or irregular shapes consists of a large number of circular dots, wherein the annular ring of speckle pattern has non-smooth inner and outer borders, wherein the second print is located on the inside of the first print, wherein the first color and the second color are different or the same, wherein the first print and the second print are concentric with the center of contact lens.

14 Claims, 4 Drawing Sheets

(56) References Cited

U.S. PATENT DOCUMENTS

| | | | |
|---|---|---|---|
| 4,582,402 A | 4/1986 | Knapp | |
| 4,634,449 A | 1/1987 | Jenkins | |
| 4,668,240 A | 5/1987 | Loshaek | |
| 4,704,017 A | 11/1987 | Knapp | |
| 4,719,657 A | 1/1988 | Bawa | |
| 4,720,188 A | 1/1988 | Knapp | |
| 4,744,647 A | 5/1988 | Meshel et al. | |
| 4,923,480 A | 5/1990 | Monestere | |
| 4,981,487 A | 1/1991 | da Costa | |
| 5,034,166 A | 7/1991 | Rawlings et al. | |
| 5,116,112 A | 5/1992 | Rawlings | |
| 5,120,121 A | 6/1992 | Rawlings et al. | |
| 5,160,463 A | 11/1992 | Evans et al. | |
| 5,260,727 A | 11/1993 | Oksman et al. | |
| 5,302,978 A | 4/1994 | Evans et al. | |
| 5,414,477 A | 5/1995 | Jahnke | |
| 5,583,163 A | 12/1996 | Müller | |
| 5,843,346 A | 12/1998 | Morrill | |
| 5,894,002 A | 4/1999 | Boneberger et al. | |
| 5,936,705 A | 8/1999 | Ocampo | |
| 5,963,298 A | 10/1999 | Bard | |
| 6,030,078 A | 2/2000 | Ocampo | |
| 6,132,043 A | 10/2000 | Atkins et al. | |
| 6,196,683 B1 | 3/2001 | Quinn et al. | |
| 6,303,687 B1 | 10/2001 | Müller | |
| 6,315,410 B1 | 11/2001 | Doshi | |
| 6,322,214 B1 | 11/2001 | Atkins et al. | |
| 6,337,040 B1 | 1/2002 | Thakrar et al. | |
| 6,479,587 B1 | 11/2002 | Stockinger et al. | |
| 6,488,375 B2 | 12/2002 | Streibig | |
| 6,488,376 B2 | 12/2002 | Streibig | |
| 6,494,575 B1 | 12/2002 | Jahnke | |
| 6,523,953 B2 | 2/2003 | Jahnke | |
| 6,627,124 B1 | 9/2003 | Herbrechtsmeier et al. | |
| 6,733,126 B2 | 5/2004 | Streibig | |
| 6,767,097 B2 | 7/2004 | Streibig | |
| 6,786,597 B2 | 9/2004 | Streibig | |
| 6,800,225 B1 | 10/2004 | Hagmann et al. | |
| 6,811,259 B2 | 11/2004 | Tucker et al. | |
| 6,824,267 B2 | 11/2004 | Streibig | |
| 6,827,440 B2 | 12/2004 | Ocampo | |
| 6,834,955 B2 | 12/2004 | Doshi | |
| 6,880,932 B2 | 4/2005 | Doshi | |
| 6,890,075 B2 | 5/2005 | Francis et al. | |
| 6,896,369 B2 * | 5/2005 | Streibig | G02C 7/046 351/159.24 |
| 6,929,367 B2 | 8/2005 | Jahnke | |
| 7,048,375 B2 | 5/2006 | Doshi et al. | |
| 7,210,778 B2 | 5/2007 | Ocampo | |
| 7,246,903 B2 | 7/2007 | Bowers et al. | |
| 7,255,438 B2 | 8/2007 | Atkins et al. | |
| 7,267,846 B2 | 9/2007 | Doshi et al. | |
| 7,278,736 B2 * | 10/2007 | Ocampo | B29D 11/00317 351/159.28 |
| 7,296,891 B2 | 11/2007 | Streibig | |
| 7,306,333 B2 | 12/2007 | Tucker et al. | |
| 7,354,959 B2 | 4/2008 | Tucker et al. | |
| 7,384,590 B2 | 6/2008 | Kelly et al. | |
| 7,387,759 B2 | 6/2008 | Kelly et al. | |
| 7,438,412 B2 | 10/2008 | Ocampo | |
| 7,549,742 B2 | 6/2009 | Doshi | |
| 7,634,715 B2 | 12/2009 | Hertzfeld et al. | |
| 7,641,336 B2 | 1/2010 | Dukes et al. | |
| 7,977,430 B2 | 7/2011 | Devlin et al. | |
| 8,770,747 B2 * | 7/2014 | Corti | G02C 7/046 351/159.3 |
| 9,039,173 B2 | 5/2015 | Tucker et al. | |
| D755,868 S | 5/2016 | Wright et al. | |
| D755,869 S | 5/2016 | Wright et al. | |
| D755,870 S | 5/2016 | Wright et al. | |
| D755,871 S | 5/2016 | Wright et al. | |
| D755,872 S | 5/2016 | Bowers | |
| D756,432 S | 5/2016 | Wright et al. | |
| D756,433 S | 5/2016 | Bowers | |
| D756,434 S | 5/2016 | Bowers | |
| D757,145 S | 5/2016 | Bowers | |
| 2001/0050753 A1 | 12/2001 | Tucker | |
| 2002/0030788 A1 | 3/2002 | Doshi | |
| 2002/0039172 A1 * | 4/2002 | Ocampo | B29D 11/00903 351/159.3 |
| 2002/0057416 A1 * | 5/2002 | Streibig | B29D 11/00903 351/159.24 |
| 2002/0080327 A1 | 6/2002 | Clark et al. | |
| 2002/0191152 A1 | 12/2002 | Hsu | |
| 2003/0025872 A1 | 2/2003 | Ocampo | |
| 2003/0025873 A1 * | 2/2003 | Ocampo | G02C 7/046 351/159.3 |
| 2003/0030773 A1 | 2/2003 | Ocampo | |
| 2003/0071964 A1 | 4/2003 | Doshi | |
| 2003/0085934 A1 | 5/2003 | Tucker et al. | |
| 2003/0117576 A1 | 6/2003 | Thakrar et al. | |
| 2003/0119943 A1 | 6/2003 | Tucker et al. | |
| 2003/0169401 A1 | 9/2003 | Ocampo | |
| 2003/0184710 A1 | 10/2003 | Tucker | |
| 2004/0119939 A1 * | 6/2004 | Clark | G02C 7/046 351/159.24 |
| 2004/0130676 A1 | 7/2004 | Doshi et al. | |
| 2005/0068491 A1 | 3/2005 | Ocampo | |
| 2005/0168688 A1 | 8/2005 | Doshi et al. | |
| 2005/0237484 A1 | 10/2005 | Ocampo | |
| 2005/0254002 A1 * | 11/2005 | Dukes | G02C 7/046 351/159.02 |
| 2005/0272833 A1 | 12/2005 | Doshi | |
| 2006/0114410 A1 | 6/2006 | Ocampo | |
| 2006/0181676 A1 | 8/2006 | Tucker et al. | |
| 2007/0263170 A1 | 11/2007 | Ocampo | |
| 2008/0225058 A1 | 9/2008 | Hertzfeld et al. | |
| 2008/0278680 A1 | 11/2008 | Ocampo | |
| 2010/0103370 A1 * | 4/2010 | Ocampo | G02C 7/046 351/159.24 |
| 2011/0069276 A1 | 3/2011 | Tucker et al. | |
| 2012/0026459 A1 | 2/2012 | Tucker et al. | |

FOREIGN PATENT DOCUMENTS

| | | |
|---|---|---|
| EP | 0982617 A1 | 3/2000 |
| EP | 1226465 B1 | 1/2006 |
| GB | 2202540 B | 10/1990 |
| GB | 2440558 B | 2/2008 |
| WO | 99/46630 A1 | 9/1999 |
| WO | 01/96934 A2 | 12/2001 |
| WO | 02/057837 A2 | 7/2002 |
| WO | 2004/061520 A1 | 7/2004 |
| WO | 2004/097503 A1 | 11/2004 |
| WO | 2005/081048 A2 | 9/2005 |
| WO | 2006/023664 A1 | 3/2006 |
| WO | 2006/063836 A1 | 6/2006 |
| WO | 2007/013857 A1 | 2/2007 |

* cited by examiner

COLORED CONTACT LENSES AND METHOD OF MAKING THE SAME

The present invention relates to colored contact lenses capable of making a wearer's eyes larger and more defined and with more shine, while remaining natural by blending seamlessly with the eye. The present invention also relates to methods for designing and manufacturing colored contact lenses of the invention.

BACKGROUND OF THE INVENTION

For cosmetic purposes, colored contact lenses having one or more colorants dispersed in the lens or printed on the lens are in high demand. These colored contact lenses enhance the natural beauty of the eye, or provide unique patterns on the iris of the wearer, or provide non-cosmetic patterns.

In general, there are two types of colored contact lenses. The first are contact lenses which use essentially transparent enhancement colors that allow the color of the natural iris to show through but combine with that natural color to produce a new appearance. Such transparent colored lenses are typically used to turn a light eye (e.g., green) to a slightly different hue (e.g., aqua). This class of colored lenses may not be able to change an underlying dark-colored brown iris to blue. The second category is the class of opaque colored lenses having a continuous opaque pattern that fully covers the iris or having an intermittent opaque pattern that does not fully cover the iris. Opaque colored contact lenses can effectively and substantially modify the wearer's eye color.

Certain contact lens consumers showed interest in enhancing their eyes without dramatically changing their natural eye color. They wanted their eyes to appear larger and more defined and with more shine, while remaining natural by blending seamlessly with the eye. However, these consumers did not want anyone to know they were wearing contact lenses, and any design would need to be natural.

Accordingly, there are still needs for colored contact lenses that are capable of making eyes larger and bolder with enhanced contrast while maintaining the wearer's natural underlying iris structure and color.

SUMMARY OF THE INVENTION

The invention provides a colored contact lens, comprising a first print of a first color and a second print of a second color, wherein the first print is an annular ring of gradient dot matrix, wherein the second print is an annular ring of speckle pattern, wherein the annular ring of speckle pattern comprises of clusters of wherein the annular ring of speckle pattern comprises clusters of regular or irregular shapes distributed annularly, wherein the regular or irregular shapes consists of a large number of circular dots, wherein the annular ring of speckle pattern has non-smooth inner and outer borders, wherein the second print is located on the inside of the first print, wherein the first color and the second color are different or the same, wherein the first print and the second print are concentric with the center of contact lens.

In another aspect, the invention encompasses a method for making a colored contact lens, comprising the steps of: providing a preformed contact lens; and
applying a first print pattern of opaque colored dots of a first color onto a surface of at least one of the anterior and posterior surfaces of the contact lens, wherein the first print is an annular ring of gradient dot matrix,
applying a second print pattern of opaque colored dot of a second color onto the surface of the contact lens, wherein the second print is an annular ring of speckle pattern, wherein the annular ring of speckle pattern comprises clusters of regular or irregular shapes distributed annularly, wherein the regular or irregular shapes consists of a large number of circular dots, wherein the annular ring of speckle pattern has non-smooth inner and outer borders, wherein the second print is located on the inside of the first print, wherein the first color and the second color are different or the same, wherein the first print and the second print are concentric with the center of contact lens.

In still another aspect, the invention encompasses a method for making a colored contact lens, comprising the steps of:
(a) providing a mold including a first mold half having a first molding surface defining the anterior surface of a contact lens and a second mold half having a second molding surface defining the posterior surface of the contact lens, wherein the first and second mold halves are configured to receive each other such that a contact lens forming cavity is formed between the first and second molding surfaces;
(b) applying, by using pad-transfer or inkjet printing technique, a second print pattern of opaque colored dot of a second color to onto at least one of molding surfaces of a lens mold, wherein the second print is an annular ring of speckle pattern, wherein the annular ring of speckle pattern comprises clusters of regular or irregular shapes distributed annularly, wherein the regular or irregular shapes consists of a large number of circular dots, wherein the annular ring of speckle pattern has non-smooth inner and outer borders, and
(c) applying, by using pad-transfer or inkjet printing technique, a first print pattern of opaque colored dots of a first color onto the surface of the mold, wherein the first print is an annular ring of gradient dot matrix, wherein the second print is located on the inside of the first print, wherein the first color and the second color are different or the same, wherein the first print and the second print are concentric with the center of contact lens.

These and other aspects of the invention will become apparent from the following description of the preferred embodiments taken in conjunction with the following drawings. As would be obvious to one skilled in the art, many variations and modifications of the invention may be affected without departing from the spirit and scope of the novel concepts of the disclosure.

DETAILED DESCRIPTION OF THE PREFERRED EMBODIMENTS

Reference now will be made in detail to the embodiments of the invention. It will be apparent to those skilled in the art that various modifications and variations can be made in the present invention without departing from the scope or spirit of the invention. For instance, features illustrated or described as part of one embodiment, can be used on another embodiment to yield a still further embodiment. Thus, it is intended that the present invention cover such modifications and variations as come within the scope of the appended claims and their equivalents. Other objects, features and aspects of the present invention are disclosed in or are obvious from the following detailed description. It is to be understood by one of ordinary skill in the art that the present discussion is a description of exemplary embodiments only, and is not intended as limiting the broader aspects of the present invention.

Unless defined otherwise, all technical and scientific terms used herein have the same meaning as commonly understood by one of ordinary skill in the art to which this invention belongs. Generally, the nomenclature used herein and the laboratory procedures are well known and commonly employed in the art. Conventional methods are used for these procedures, such as those provided in the art and various general references. Where a term is provided in the singular, the inventors also contemplate the plural of that term.

A "contact lens" refers to an object that can be placed on or within a wearer's eye. A contact lens can correct, improve, or alter a user's eyesight, but that need not be the case. A contact lens can be of any appropriate material known in the art or later developed, and can be a soft lens, a hard lens, or a hybrid lens. A contact lens can be tinted before printing any color patterns. A contact lens can be in a dry state or a wet state. "Dry State" refers to a soft lens in a state prior to hydration or the state of a hard lens under storage or use conditions. "Wet State" refers to a soft lens in a hydrated state.

The "front or anterior surface" of a contact lens, as used herein, refers to the surface of the lens that faces away from the eye during wear. The anterior surface, which is typically substantially convex, may also be referred to as the front curve of the lens.

The "rear or posterior surface" of a contact lens, as used herein, refers to the surface of the lens that faces towards the eye during wear. The rear surface, which is typically substantially concave, may also be referred to as the base curve of the lens.

A "colored contact lens" refers to a contact lens (hard or soft) having a color image printed thereon. A color image can be a cosmetic pattern, for example, iris-like patterns, Wild Eye™ patterns, made-to-order (MTO) patterns, and the like. A color image can be a single color image or a multi-color image. A color image is preferably a digital image, but it can also be an analog image.

The term "eye color" refers to the color of the eye iris.

The term "ordinary viewer" is intended to mean a person having normal 20/20 version standing about 5 feet from a person wearing the lenses of the invention.

The term "non-opaque" as used herein is intended to describe transparent or translucent color or a part of the lens that is uncolored or colored with transparent or translucent coloring.

A "colored coat" refers to a coating on an object and having a color image printed therein.

A "colorant" means either one or more dyes or one or more pigments or a mixture thereof that is used to print a pattern of colored elements on a contact lens.

"Dye" means a substance that is soluble in a solvent or water and that is used to impart color. Dyes typically have low opacity and are nearly transparent or translucent. Dyes can cover both optical regions of contact lenses and non-optical regions of contact lenses.

A "pigment" means a powdered substance that is suspended in a liquid in which it is insoluble. Pigments are used to impart color. Pigments, in general, are more opaque than dyes.

The term "a conventional or non-pearlescent pigment" as used herein is intended to describe any absorption pigments that impart color based on the optical principle of diffuse scattering and its color is independent of its geometry. While any suitable non-pearlescent pigment may be employed, it is presently preferred that the non-pearlescent pigment is heat resistant, non-toxic and insoluble in aqueous solutions. Examples of preferred non-pearlescent pigments include any colorant permitted in medical devices and approved by the FDA, such as D&C Blue No. 6, D&C Green No. 6, D&C Violet No. 2, carbazole violet, certain copper complexes, certain chromium oxides, various iron oxides, phthalocyanine green, phthalocyanine blue, titanium dioxides, etc. See Marmiom DM Handbook of U.S. Colorants for a list of colorants that may be used with the present invention. A more preferred embodiment of a non-pearlescent pigment include (C.I. is the color index no.), without limitation, for a blue color, phthalocyanine blue (pigment blue 15:3, C.I. 74160), cobalt blue (pigment blue 36, C.I. 77343), Toner cyan BG (Clariant), Permajet blue B2G (Clariant); for a green color, phthalocyanine green (Pigment green 7, C.I. 74260) and chromium sesquioxide; for yellow, red, brown and black colors, various iron oxides; PR122, PY154, for violet, carbazole violet; for black, Monolith black C-K (CIBA Specialty Chemicals).

"Pearlescence" means having a pearly luster; resembling a pearl in physical appearance; or a color having a shiny, slightly reflective appearance.

A "pearlescent pigment" refers to a class of interference (effect) pigments, which are transparent thin platelets of low refractive index material (e.g., transparent mica platelets) coated with optically thin coating of a high refractive index material (e.g., metal oxide, such as, for example titanium oxide or iron oxide), and which impart color mainly based on the optical principle of thin-film interference. The optically thin coating of metal oxide can be comprised of single or multiple thin layers of metal oxide. Optically thin coatings applied to the platelets contribute interference effects, which allow the appearance to vary depending upon illumination and viewing conditions. The color is determined by the coating thickness, the refractive index and the angle of illumination. Optically thin coatings are also responsible for the rich, deep, glossy effect due to partial reflection from the metal oxide and partial transmission through the mica platelets. This class of pigment can provide pearly luster and iridescent effects.

Pearlescent pigments which are mica platelets with an oxide coating are commercially available from by the Englehard Corp. of Iselin, N.J., under the "Mearlin Pigment" line, such as "Hi-Lite Interference Colors," "Dynacolor Pearlescent Pigments", "MagnaPearl", "Flamenco," and "Celini Colors." Additional manufacturers of pearlescent colorants are: Kemira, Inc. in Savannah, Georgia, the pigments having the trade name "Flonac Lustre Colors"; and EM Industries, Inc. of Hawthorne, N.Y., the pigments having the trade name "Affair Lustre Pigments".

The term "pearlescently colored" as used herein is intended to describe an element of a colored pattern that is colored with a pearlescent colorant (i.e., containing at least one pearlescent pigment).

In the case of pearlescent pigments, it is important during processing to minimize platelet breakage and maintain a sufficient level of dispersion. Pearlescent pigments require gentle handling during mixing and they should not be ground, or subjected to prolonged mixing, milling or high shear since such operations can damage the pigments. Particle size distribution, shape and orientation strongly influence final appearance. Milling, high shear mixing or prolonged processing of pearlescent pigments should be avoided since such operations might lead to delamination of metal oxide coated layer, fragmentation of platelets, platelet agglomeration and platelet compaction. Delamination of metal oxide, compaction, fragmentation and agglomeration will reduce pearlescent effects.

The term "shining effect" as used herein is intended to describe the effect by using a combination of small elements in the design and inks that may be brighter in color than the rest of the pattern and/or have a pearlescent structure to provide eye appearance of reflection with a sparkling luster. Metallic or pearlescent pigments may impart shine, sparkle, or brightness by the nature of their flake type or structure. In addition, a shiny, sparkly, or bright appearance may also be achieved by increasing the lightness and/or chroma of the ink color compared to other parts of the pattern or compared to the natural iris. In CIELAB terminology, this would equate to a higher L* (lightness) and/or C* (chroma) value of the elements that are meant to give the appearance of shine, sparkle, or brightness compared to the L* or C* of the rest of the print pattern and/or the natural iris.

An "uneven or jagged or irregular border or peripheral edge" as used herein refers to a border or a peripheral edge on which the outmost positions have radial distances (i.e., from the lens center) which differ from each other by at least about 20%. A "even border or peripheral edge" as used herein refers to a border or a peripheral edge on which the outermost positions have substantially constant radial distances (i.e., from the lens center), namely differing from each other less than 20%.

The term "percent of print coverage or dot coverage" refers to the portion of the total area within the region covered by the color dots as measured by using Adobe Photoshop graphics image editing software) to determine the number of pixels on an area. The percent of print coverage is calculated as follows:

% print coverage=[(number of pixels of dot coverage area)/(number of pixels of a total area)]×100

Total area=printed area+un-printed area

"Hydrogel" means a cross-linked polymer having equilibrium content between about 10 and 90 percent water.

A "lens-forming material" refers to a polymerizable composition which can be can be cured (i.e., polymerized and/or crosslinked) thermally or actinically (i.e., by actinic radiation) to obtain a crosslinked polymer. Examples of actinic radiation are UV irradiation, ionized radiation (e.g. gamma ray or X-ray irradiation), microwave irradiation, and the like. Thermal curing or actinic curing methods are well-known to a person skilled in the art. Lens-forming materials are well known to a person skilled in the art such as: HEMA-based hydrogel and silicone hydrogel.

A "HEMA-based hydrogel" refers to a hydrogel obtained by copolymerization of a polymerizable composition comprising hydroxyethyl methacrylate (HEMA).

A "silicone hydrogel" refers to a hydrogel obtained by copolymerization of a polymerizable composition comprising at least one silicone-containing monomer or at least one silicone-containing macromer.

"Hydrophilic," as used herein, describes a material or portion thereof that will more readily associate.

A "print-on-mold process for producing colored contact lenses" refers to a process for molding a colored contact lens described in U.S. Pat. No. 5,034,166 to Rawlings et al. (herein incorporated by reference).

This invention is directed to a colored contact lens designed to enhance a wearer's natural eye color and make them bolder while providing a very natural appearance as perceived by the ordinary viewer.

For example, certain dark-eyed contact lens consumers have shown interest in enhancing their eyes without dramatically changing their natural eye color. They want their eyes to appear darker, bolder, and larger-appearing, and with more shine, while remaining natural by blending seamlessly with the eye. However, these consumers did not want anyone to know they were wearing contact lenses, and any design would need to be natural. Light-colored (i.e. blue or green) and medium-colored (i.e. hazel, light brown) contact lens consumers also show similar interest in enhancing their eyes dramatically, yet naturally, without changing their natural eye color.

It is discovered that such cosmetic effects (i.e., enhancing a wearer's eye color and make them bolder while providing a very natural appearance) can be achieved by placing a colored design on a contact lens to improve the contrast of the wearer's eye, particularly their limbus. This design can be applied by printing onto a contact lens through conventional means. This invention has illustrated certain designs and colors which provide this color on eye yet blends with the wearer's natural eye color. The invention described here is a series of rings placed on top of each other to provide the desired effect. This first print layer is a diffuse pattern with gradient dot matrix which allows the underlying limbus and iris structure to be seen. The design of the first print of the present invention help to provide both attributes of a natural-looking pattern and a high contrast with the wearer's natural eye, especially when the first print is superimposed with the second print. The first print blocks some of the light reflecting off the underlying iris and allows good blending with the natural eye. The second print is an annular ring of speckle pattern, the annular ring of speckle pattern comprises clusters of irregular speckle shape distributed annularly, and the speckle shape consists of a large number of small dots, the annular ring of speckle pattern has non-smooth inner and outer borders.

The second print is located on the inside of the first print, and a circular border differentiates the first and the second prints, wherein the circular border is even or jagged, wherein the first color and the second color are different or the same, wherein the first print and the circular border are concentric with the center of contact lens. The width of the speckle annular ring pattern is about 30-90% of the width of the annular ring of gradient dot matrix. The second print of an annular ring of speckle pattern can enhance the first print of the annular ring of gradient dot matrix. The annular ring of speckle pattern is superimposed with the annular ring of gradient dot matrix pattern, wherein the inner diameter of the speckle pattern is smaller than the inner diameter of the gradient dot ring and the centers of the rings are concentric to each other. The enhanced annular ring of gradient dot matrix pattern provides an even more attractive design with perceived even larger and bolder eyes than the non-enhanced annular ring of gradient dot matrix pattern.

The two layers superimposed provide the desired colored design, which covers and accentuates the wearer's natural limbal ring and eye color more than a single layer by itself. On eye, the pattern provides an attractive design with perceived larger and bolder eyes. It is also discovered that such cosmetic effects (i.e., enhancing a wearer's eye color and make them bolder while providing a very natural appearance) works particularly well for contact lens wearer having a dark-eye as well as many other eye colors. The larger appearance is created by increasing the size of the design pattern such that it results in a larger pattern on the final lens to achieve the desired on-eye appearance of a larger iris. This first print pattern of the present patent application is intended to cover the outer portions of the natural iris (outside the natural pupil area), the natural limbus, and a portion of the natural sclera, just outside the natural iris. Therefore, according to the present patent application, the larger appearance is created by increasing the size of the first print pattern of annular ring of gradient dot matrix and enhanced by the second print of an annular ring of speckle pattern. It is further discovered that the above described contact lens further comprises a third print of a third color gives brightness and depth to a naturally dark eye. The same or extra colors, hues and shades add further depth, thereby providing a contact lens capable of making a subtle change and enhancing the color of the iris of a dark-eyed person wearing the lens while imparting a very natural appearance. According to the present application, the third print is a first tulip flower ring pattern, the third print has an identical or smaller outer diameter than that of the second print; the third print has a smaller inner diameter than that of the second print, wherein a tulip flower has a shape comprising two elements: a first element is a vermicular shape having a thicker center and thinner having a first end and a second end; a second element is a mirror image of the first element, the first end of the first element and the first end of the second element are converged to touch each other and the second end of the first element and the second end of the second element are diverged, wherein the tulip flower is repeated annularly around to form a ring with the converged points pointing inwards, wherein the first color, the second color and the third color are different or the same, wherein the first print, the second print and the third print are concentric with the center of contact lens.

It is still further discovered that the above described contact lens further comprises a fourth print of a fourth color, the fourth print is a second tulip flower ring pattern, wherein the second tulip flower ring is formed by repeating the tulip flower annularly around to form a ring with the diverged points pointing inwards (toward pupil). The fourth print has tulip flowers annularly around to form a ring with the diverged points pointing inwards (toward pupil) while the third print has tulip flowers annularly around to form a ring with the converged points pointing inwards (toward pupil). Since the third print pattern and the fourth print pattern are offset, leeway is given to accentuate the same or extra colors to give the contact lens pattern for more natural look and add still Furth depth.

According to this patent application, shine, sparkle, or brightness may be imparted to the eye by using a combination of small elements in the design and inks that may be brighter in color than the rest of the pattern or have a pearlescent structure. Metallic or pearlescent pigments may impart shine, sparkle, or brightness by the nature of their flake type or structure; however, a shiny, sparkly, or bright appearance may also be achieved by increasing the lightness and/or chroma of the ink color compared to other parts of the pattern or compared to the natural iris. In CIELAB terminology, this would equate to a higher L* (lightness) and/or C* (chroma) value of the elements that are meant to give the appearance of shine, sparkle, or brightness compared to the L* or C* of the rest of the print pattern and/or the natural iris.

In CIELAB color space, the L* value refers to the lightness of a color compared to a gray scale ranging from black to white. C* refers to the chroma of a color, or the departure of a color moving away from the gray scale. This is similar, but not exactly the same as, the saturation of a color. The hue angle, h°, refers to the hue of the color which can be thought of as a basic color name: red, orange, yellow, green, blue, and purple.

To impart shine, sparkle, or brightness to a contact lens, the intended elements should be between 10 and 90 L* units above the other colors used in the cosmetic lens or the C* of the intended elements should be between 10 and 90 C* units above the other colors used in the cosmetic lens. Ideally, both the L* and the C* should be between 10 and 90 units above the color of the other colors used in the cosmetic lens.

For example, a print pattern with a black outer ring and some brown speckle pattern elements meant to blend into the eye might also include some flecks such as small flame shapes that might be orange or yellow in color, and may or may not include a pearlescent pigment such as mica. Orange and yellow colors have higher L* and C* values than brown colors, by their nature, as brown is considered a low chroma orange color, and not considered a hue on its own. In this instance, the orange and yellow colors would be at least 10 L* and/or C* units higher than the black and brown colors used in the lens.

The hue of the elements intended to impart shine may or may not be similar to the ink in the rest of the print pattern. For example, blue elements with higher L* and C* units may be used on this otherwise brown and black cosmetic lens.

In one respect, the invention provides a colored contact lens, comprising a first print of a first color and a second print of a second color, wherein the first print is an annular ring of gradient dot matrix, wherein the second print is an annular ring of speckle pattern, wherein the annular ring of speckle pattern comprises of clusters of wherein the annular ring of speckle pattern comprises clusters of regular or irregular shapes distributed annularly, wherein the regular or irregular shapes consists of a large number of circular dots, wherein the annular ring of speckle pattern has non-smooth inner and outer borders, wherein the second print is located on the inside of the first print, wherein the first color and the second color are different or the same, wherein the first print and the second print are concentric with the center of contact lens.

As well known in the art, a color is generally described mainly by the following inter-related terms: hue, chroma, intensity, saturation, luminance, brightness, value and opacity.

The term "different colors" is intended to describe that two colors are different in at least one of hue, chroma, intensity, saturation, luminance, brightness, value, and opacity. The term "second color different from said first color" (or some similar language) as used herein is intended to mean that both colors are of totally different colors, such as blue and hazel; or that both colors are the same hue, but have different lightness, values such as light blue and dark blue.

The term "an annular ring of gradient dot matrix" is intended to mean gradually increase local colored dot coverage in a radial direction (from the center to the edge) of an annular ring by increasing the print density. For example, the larger number of printed colored dots within an area near the exterior periphery edge of an annular ring causes the appearance of a darker exterior periphery edge of the annular ring than the interior periphery edge of the annular ring. Alternately, while fixing the spacing of the center of each dot, the larger size of colored dots within an area near the exterior periphery edge of an annular ring causes the appearance of a darker exterior periphery edge of the annular ring than the interior periphery edge of the annular ring. Alternately, the print density can be decreased by removing printed area, such as by removing print from a high print density region (i.e. circular voids). The interior peripheral edge of an annular ring refers to an edge being closest to the center of the colored lens. The exterior peripheral edge of an annular ring refers to an edge being farthest to the center of the colored lens. Alternately, the gradient dot matrix can be composed of a consistent dot density.

The printed colored dots or void areas can have any shape, regular or irregular, such as circular, oval, triangular, square, hexagonal, elongated, etc. All colored dots or void areas can have similar or different shapes. Preferably, all printed dots or void areas have substantially similar shape. More preferably, all printed dots or void areas have circular shapes.

The range of dot sizes is preferably from 0.01 to about 0.5 mm. The spacing between dots is preferred from 0.01 to about 0.3 mm. Also, the removed printed areas are circles (i.e. circular voids) from 0.01 to about 0.3 mm, with spacing from 0.01 to 0.3 mm.

Figure 1:
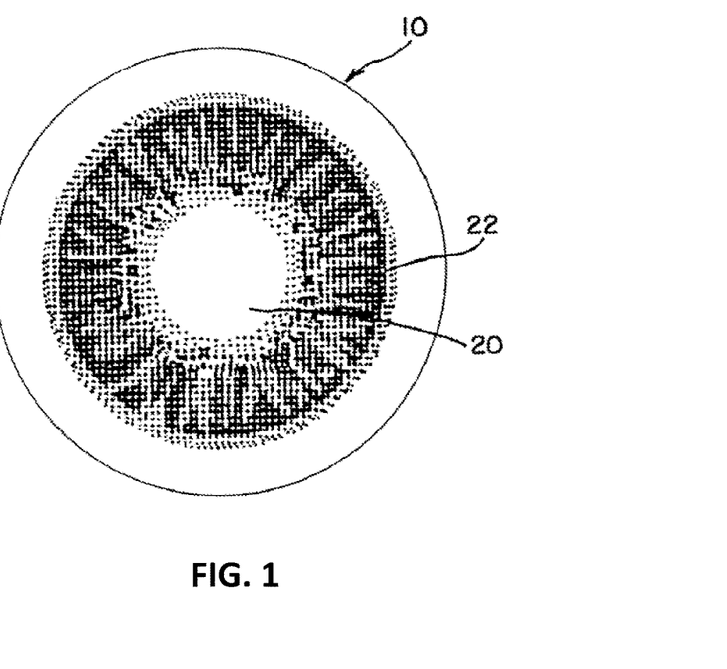
FIG. 1 illustrates a prior art contact lens.

FIG. 1 as an example illustrates a prior art contact lens. It has a non-opaque pupil section 20 in the center of lens, and an annular iris section 21 surrounding the pupil section. For hydrophilic lenses, a transparent peripheral section 22 surrounds iris section 21. A colored, opaque, intermittent pattern is located over the entire iris section 21, as shown in FIG. 1. The pattern leaves a substantial portion of the iris section within the interstices of the pattern non-opaque. The non-opaque areas of iris section 21 appear white in FIG. 1.

Figure 2:
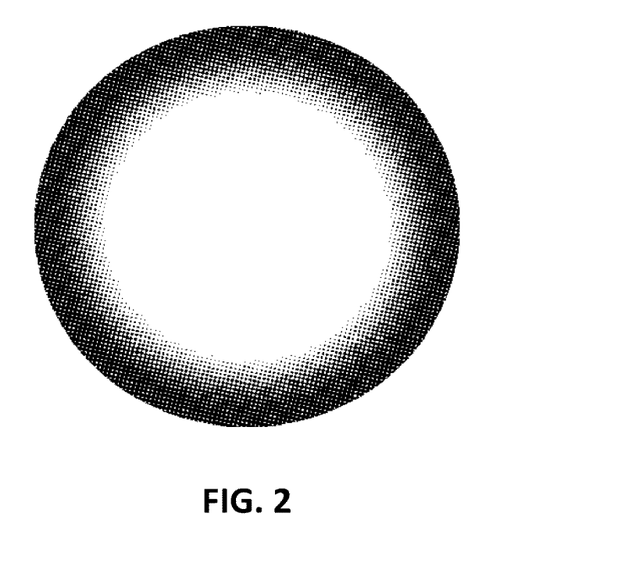
FIG. 2 illustrates a first print pattern which is a pattern of annular ring of a gradient dot matrix in accordance with the present invention.

FIG. 2 as an example schematically illustrates a "first print pattern" which consists of an annular ring of gradient dot matrix. The dots, preferably opaque dots, can have any shape, regular or irregular, such as circular, oval, triangular, square, hexagonal, elongated, etc. All dots can have similar or different shapes. Preferably, all dots have substantially similar shape. More preferably, all dots have circular shapes. The first print pattern is concentric with the center of a lens and has a substantially even exterior peripheral edge and a substantially even interior peripheral edge. The exterior peripheral edge of the first print has a diameter from about 12.5 mm to about 15 mm and the width of the first print is from about 0.8 mm to about 3.5 mm and preferred from about 2.0 mm to about 3.0 mm. The first print can be many colors, for example, black, blue, gray, brown, light blue, turquoise, violet, dark-violet, blue-violet, aqua, yellow or green. A preferred color for the first print is black or brown.

Figure 3:
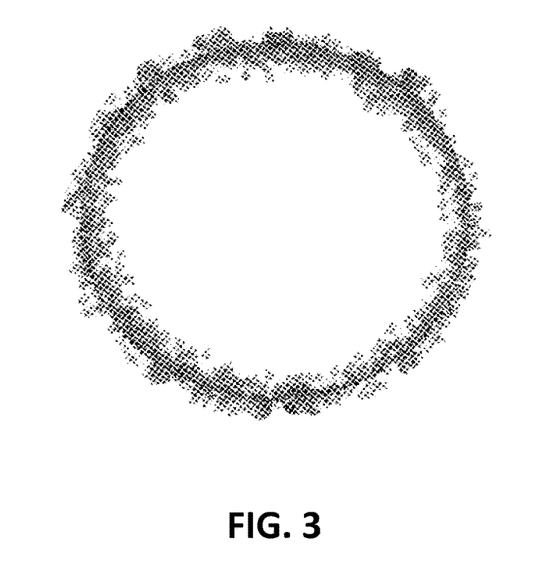
FIG. 3 illustrates a second print pattern which is an annular ring of speckle pattern.

FIG. 3 illustrates a "second print pattern" which is an annular ring of speckle pattern. According to the present application, the annular ring of speckle pattern comprised clusters of regular or irregular shapes, such as circular, oval, triangular, square, hexagonal, elongated, etc. distributed annularly, wherein the regular or irregular shapes consists of a large number of circular dots, According to the present invention, a large number of circular dots refer to from 4 to 2500, preferable from 10 to 1500, more preferable from 15 to 500 and even more preferable from 20 to 300 of circular dots. The width of the speckle annular ring pattern is about 30-90% of the width of the annular ring of gradient dot matrix.

Figure 4:
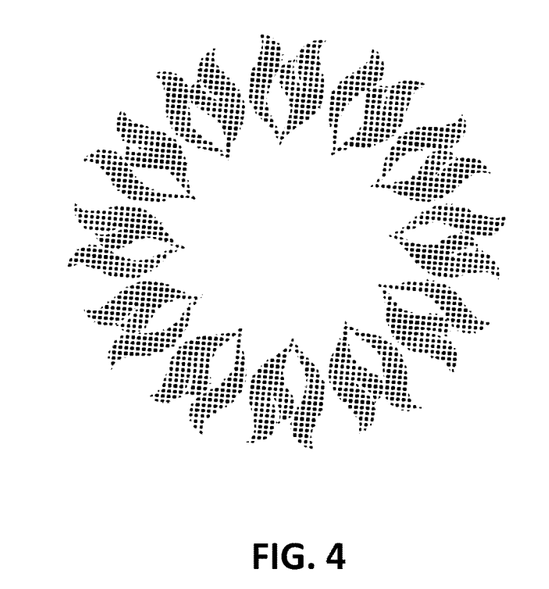
FIG. 4 illustrates a third print pattern which is a first tulip flower ring pattern.

FIG. 4 illustrates a "third print pattern" which is a tulip flower pattern in accordance with the present invention. the third print is a first tulip flower ring pattern has a shape comprising two elements, the first element is a vermicular shape having a thicker center and thinner at a first end and a second end; the second element is a mirror image of the first element, the first end of the first element and the first end of the second element are converged to touch each other and the second end of the first element and the second end of the second element are diverged, wherein the tulip flower is repeated annularly around to form a ring with the converged points pointing inwards to create a U-shaped chalice shape.

A third element is a reduced in size of the first element and sits within the U-shaped chalice and contact at least one side.

According to the present invention, the tulip flower shapes may contain all three elements, or optionally just the first two elements. This shape is repeated annularly around to form a ring with the converged points pointing inwards.

Figure 5:
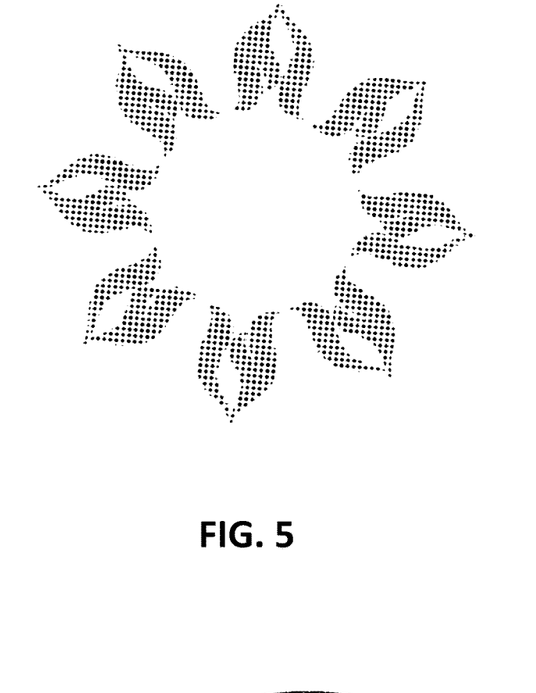
FIG. 5 illustrates a fourth print pattern which is a second tulip flower ring pattern.

FIG. 5 illustrates a "fourth print pattern" which is a second tulip flower pattern in accordance with the present invention. The second tulip flower pattern also consists of tulip flower shapes that have been repeated around an annular ring. The second tulip flower shape is the same as the first tulip flower shapes shown in FIG. 3 with the following exception: 1) the tulip flower shape is repeated annularly around to form a ring with the converged points pointing inwards to the center of contact lens pattern; 2) tulip flower shape is smaller or bigger.

Figure 6:
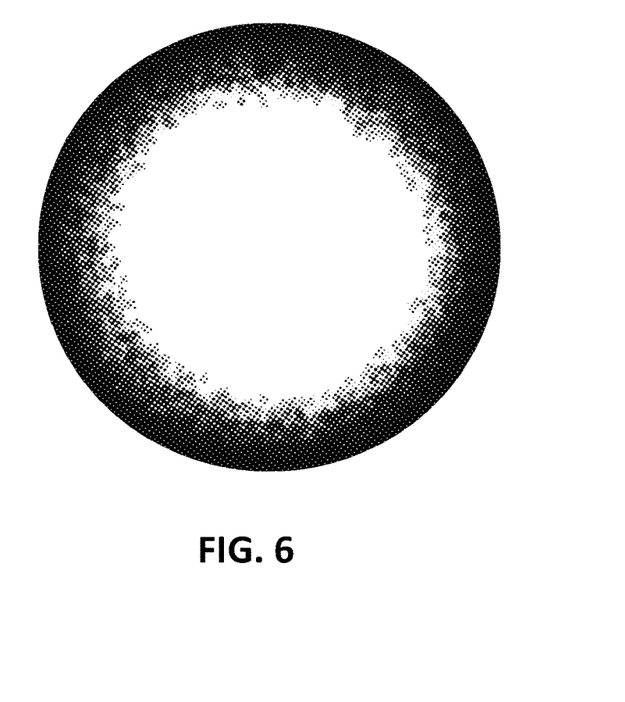
FIG. 6 illustrates an example of contact lens which contains two print patterns (FIG. 2 and FIG. 3) in accordance with the present invention.

FIG. 6 illustrates an example of contact lens which contains two print patterns to form an enhanced outer ring pattern which is the combination of annular ring of gradient dot matrix of FIG. 2 and annular ring of speckle pattern of FIG. 3. The inner diameter of the annular ring of speckle pattern is smaller than the inner diameter of the gradient dot annular ring and the centers of the rings are concentric to each other. This annular ring of speckle pattern creates better blending with the natural iris.

Figure 7:
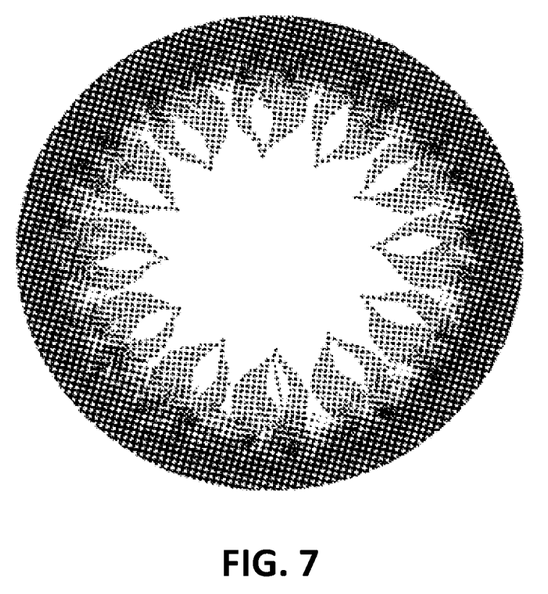
FIG. 7 illustrates an example of contact lens which contains three print patterns (FIG. 2, FIG. 3 and FIG. 4) in accordance with the present invention.

FIG. 7 illustrates an example of contact lens which contains three print patterns (FIG. 2, FIG. 3 and FIG. 4) in accordance with the present invention. FIG. 7 design is a three print pattern where the top-most pattern is a dark, well-defined outer ring specifically meant to increase the appearance of the iris diameter. Superimposed with the gradient dot pattern (FIG. 2) is an annular ring of speckle pattern (FIG. 3). The annular ring of speckle pattern comprised clusters of regular or irregular shapes distributed annularly, wherein the regular or irregular shapes consists of a large number of circular dots. The annular ring of speckle pattern has non-smooth inner and outer borders. According to the present invention, the width of the speckle annular ring pattern is about 30-90%, preferably about 35-80% and more preferably 40-70% of the width of the annular ring of gradient dot matrix. When evaluating the layers separately, the inner diameter of the speckle pattern is smaller than the inner diameter of the gradient dot ring and the centers of the rings are concentric to each other. This speckle pattern creates better blending with the natural iris. The combination of patterns forming the enhanced outer ring pattern is shown in FIG. 6.

Figure 8:
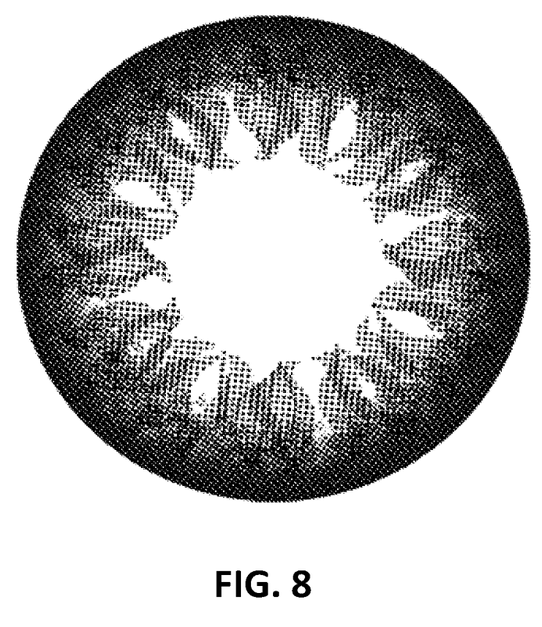
FIG. 8 illustrates a third example of contact lens which contains four print patterns (FIG. 2, FIG. 3, FIG. 4 and FIG. 5) in accordance with the present invention.

FIG. 8 illustrates a third example of contact lens which contains four print patterns (FIG. 2, FIG. 3, FIG. 4 and FIG. 5) in accordance with the present invention. FIG. 8 design is a four print pattern where the top-most pattern is a dark, well-defined outer ring specifically meant to increase the appearance of the iris diameter. The fourth layer is a second tulip flower ring pattern which consists of similar tulip flower shapes that have been repeated in different manners around an annular ring, comparing to the first tulip flower ring pattern.

The second tulip flower ring pattern also has a shape comprising two elements, the first element is a vermicular shape having a thicker center and thinner at a first end and a second end; the second element is a mirror image of the first element, the first end of the first element and the first end of the second element are converged to touch each other and the second end of the first element and the second end of the second element are diverged, wherein the tulip flower is repeated annularly around to form a ring with the diverged points pointing inwards (toward to pupil) to create a U-shaped chalice shape.

A third element is a reduced in size of the first element and sits within the U-shaped chalice and contact at least one side.

This shape may contain all three elements, or optionally just the first two elements. This shape is repeated annularly around to form a ring with the converged points pointing inwards (toward to pupil) for a first tulip flower print pattern layer as shown in FIG. 4. The other pattern layer uses this shape, also repeated annularly around to form a ring, but with the diverged points pointing inwards (toward to pupil) for a second tulip flower print pattern as shown in FIG. 5.

The combination of the four patterns create a thick, dark outer ring that blends with both the other layers and the natural iris and a lace-like structure with thick long waves overlapping randomly such that there are areas of no coverage and areas where both layers overlap to create a design that blends well with the natural iris and may provide depth, sparkle, or shine to the appearance of the lens.

The combination of the four patterns is illustrated in FIG. 8. The first tulip flower-like print pattern in this design is approximately 85%-95% of the diameter of the enhanced outer ring print pattern. Additionally, the second tulip flower print pattern is approximately 80%-95% of the diameter of the enhanced outer ring print pattern.

On eye, the pattern in accordance with the invention provides an attractive design with perceived larger and bolder eyes.

A colored contact lens can be made by applying an ink directly onto a preformed contact lens. A preferred method for applying an ink onto a contact lens in accordance with this invention is through printing, for example, pad-transfer printing and/or inkjet printing using an ink, preferably a water-based ink.

An ink typically comprises at least one colorant, a binder polymer, and a solvent. An ink can optionally include a crosslinker, a humectant, a surfactant, a monomer, a polymerization initiator, an antimicrobial agent, an antioxidant agent, an anti-kogating agent, and other additives known in the art.

A colorant comprises at least one dye or preferably one pigment. Conventional and/or pearlescent pigments can be used in the invention.

A solvent can be water (water-based inks) or any appropriate organic solvent (organic solvent-based inks). Any known suitable solvents can be used, so long as they can dissolve the binder in the ink of the invention and aid in the stability of the colorant. Examples of preferred solvents include water, or water mixed with one or more co-solvent. Alternately, organic solvents such as alcohols, glycols, ketones, esters, methyl ethyl ketone, cyclopentanone, and cyclohexanone could be used.

"A binder polymer" refers to a crosslinkable polymer that comprises crosslinkable groups and can be crosslinked by a crosslinker or upon initiation by a chemical or physical means (e.g., moisture, heating, UV irradiation or the like) to trap or bind colorants onto or into a contact lens such as that term is known in the art.

The term crosslinkable groups is employed herein in a broad sense and is intended to encompass, for example, functional groups and photo crosslinkable or thermally crosslinkable groups, which are well-known to a person skilled in the art. It is well known in the art that a pair of matching crosslinkable groups can form a covalent bond or linkage under known reaction conditions, such as, oxidation-reduction conditions, dehydration condensation conditions, addition conditions, substitution (or displacement) conditions, free radical polymerization conditions, 2+2 cyclo-addition conditions, Diels-Alder reaction conditions, ROMP (Ring Opening Metathesis Polymerization) conditions, vulcanization conditions, cationic crosslinking conditions, and epoxy hardening conditions. For example, an amino group is covalently bondable with aldehyde (Schiff base which is formed from aldehyde group and amino group may further be reduced); an hydroxyl group and an amino group are covalently bondable with carboxyl group; carboxyl group and a sulfo group are covalently bondable with hydroxyl group; a mercapto group is covalently bondable with amino group; or a carbon-carbon double bond is covalently bondable with another carbon-carbon double bond. Exemplary covalent bonds or linkage, which are formed between pairs of crosslinkable groups, include without limitation, alkane (carbon-carbon single bond), alkene (carbon-carbon double bond), ester, ether, acetal, ketal, vinyl ether, carbamate, urea, amine, amide, enamine, imine, oxime, amidine, iminoester, carbonate, orthoester, phosphonate, phosphinate, sulfonate, sulfinate, sulfide, sulfate, disulfide, sulfinamide, sulfonamide, thioester, aryl, silane, siloxane, heterocycles, thiocarbonate, thiocarbamate, and phosphonamide.

Exemplary crosslinkable groups include, without limitation, hydroxyl group, amine group, amide group, sulfhydryl group, —COOR (R and R' are hydrogen or $C_1$ to $C_8$ alkyl groups), halide (chloride, bromide, iodide), acyl chloride, isothiocyanate, isocyanate, monochlorotriazine, dichlorotriazine, mono- or di-halogen substituted pyridine, mono- or di-halogen substituted diazine, phosphoramidite, maleimide, aziridine, sulfonyl halide, hydroxysuccinimide ester, hydroxysulfosuccinimide ester, imido ester, hydrazine, axidonitrophenyl group, azide, 3-(2-pyridyl dithio)proprionamide, glyoxal, aldehyde, epoxy, olefinically unsaturated radicals.

A binder polymer in the ink can be any polymer which is compatible with lens material. A binder polymer can be prepared by polymerization of monomers containing vinyl alcohol, vinyl butyral, vinyl acetate, acrylic acid, methacrylic acid, hydroxy $C_1$ to $C_6$ alkyl ester of acrylic acid and methacrylic acid, amino $C_1$ to $C_8$ alkyl ester of acrylic and methacrylic acid, glycerol esters of acrylic and methacrylic acid, vinylpyrrolidone, vinylchloride, hydroxyethyl methacrylate, dimethylacrylamide, and the like. Mixtures of these different monomers could be made to form various copolymers. Other polymers could include various cellulosic resins, polyesters, polyurethanes, polyureas, or polyamides that have at least one crosslinkable group. Preferably, monomers used in preparing a binding polymer is the same as that for monomers used in making a lens.

An ink for printing a colored lens of the invention can be prepared according any known suitable methods. For example, first a solution of binding polymer and solvent is prepared and this solution is mixed with paste containing the colorant to form an ink.

Pad transfer printing is well known in the art (see. For example, U.S. Pat. No. 3,536,386 to Spivack; U.S. Pat. Nos. 4,582,402 and 4,704,017 to Knapp; U.S. Pat. No. 5,034,166 to Rawlings et al., herein incorporated by reference in their entireties). A typical example of this printing follows. An image is etched into metal to form a cliché. The cliché is placed in a printer. Once in the printer, the cliché is inked by either an open inkwell doctoring system or by a closed ink cup sliding across the image. Then, a silicone pad picks up the inked image from the cliché and transfers the image to the contact lens. The silicone pads are made of a material comprising silicone that can vary in elasticity. The properties of the silicone material permit the inks to stick to the pad temporarily and fully release from the pad when it contacts a contact lens or a mold. Appropriate pad-transfer printing structures include, but are not limited to, Tampo-type printing structures (Tampo vario 90/130), rubber stamps, thimbles, doctor's blade, direct printing, or transfer printing as they are known in the art.

Any known suitable silicone pad can be used in the present invention. Silicone pads are commercially available. However, different pads could give different print qualities. A person skilled in the art will know how to select a pad for a given ink.

Clichés can be made of ceramics or metals (e.g., steel). Where a cliché is made of a steel, it would be desirable to neutralize the pH of a water-based ink (e.g., adjusted pH to 6.8~7.8) by adding a buffer (such as, for example, phosphate salts). Images can be etched into a cliché according to any methods known to a person skilled in the art, for example, by chemical etching or laser ablation or the like. It is also desirable to clean cliché s after use using standard cleaning techniques known to a person skilled in the art, such as, for example, immersion in a solvent, sonication, or mechanical abrasion.

It is understood that either the anterior (convex) or posterior (concave) surfaces of the lens may be printed, but printing the anterior surface is presently preferred.

Printing the lens using an inkjet printing process is described in published US Patent Application Nos. 2001/0050753, 2001/0085934, 2003/0119943, and 2003/0184710, herein incorporated by references in their entireties.

In accordance with a preferred embodiment, a colored contact lens may further comprise a clear coating covering at least the colored area of a lens. A clear coating can be formed on the colored area by applying a layer of a clear polymerizable solution free of any colorant onto the lens surface with color prints and then polymerizing the layer of clear polymerizable solution. A clear coat may minimize leaching of a colorant and may enhance wearer's comfort.

Alternatively, a colored contact lens of the invention can be made according to a print-on-mold process similar to those described in U.S. Pat. No. 5,034,166 to Rawlings et al. (herein incorporated by reference). An ink can be applied first on the molding surface of one or both mold portions by using pad transfer printing (or pad printing) or inkjet printing to form a colored coat (with a color image). A colored coat can be applied on the molding surface defining the posterior (concave) surface of a contact lens or on the molding surface defining the anterior surface of a contact lens or on both mold portions. Preferably, a colored coat (with a color image) is applied on the molding surface defining the anterior surface of a contact lens.

Optionally, a transferable coating can be applied to a molding surface of a mold before applying the ink by pad transfer printing. A transfer coating is intended to describe a coating which can be detached from a molding surface of a mold and become integral with the body of a contact lens molded in the mold. A transferable coating can be applied to a molding surface of mold by any suitable techniques, such as, for example, spraying, printing, swabbing, or dipping. A transferable coating can be prepared from a solution comprising polymerizable components and free of any colorants. For example, a transferable coating with substantially uniform thickness (less than 200 microns) can be prepared by spraying a molding surface with a solution having the composition (without colorant) of an ink to be used or a solution of prepolymer or a lens-forming material to be used. This transferable coating can optionally be dried or cured to form a transferable clear film (without any pigment but optionally with dyes including reactive dyes). One or more colored patterns can then be printed on this transferable coating or film. By applying a transferable coating before printing, one can make a colored lens in which printed colored patterns are embedded just below a film derived from the transferable coating. Such a lens may be more comfortable for wearing and have much less susceptibility to colorant leaching out of the colored lens.

After printing an ink of the invention on a molding surface of a mold, the printed ink can be cured by UV or other actinic radiation to form a colored film in accordance with the invention. It is desirable that the printed ink is cured actinically to an extent to minimize loss of pattern definition of the colored coat resulted from subsequent filling of a lens-forming material.

Lens molds for making contact lenses are well known to a person skilled in the art and, for example, are employed in cast molding or spin casting. For example, a mold (for cast molding) generally comprises at least two mold sections (or portions) or mold halves, i.e. first and second mold halves. The first mold half defines a first molding (or optical) surface and the second mold half defines a second molding (or optical) surface. The first and second mold halves are configured to receive each other such that a lens forming cavity is formed between the first molding surface and the second molding surface. The molding surface of a mold half is the cavity-forming surface of the mold and in direct contact with lens-forming material.

Methods of manufacturing mold sections for cast-molding a contact lens are generally well known to those of ordinary skill in the art. The process of the present invention is not limited to any particular method of forming a mold. In fact, any method of forming a mold can be used in the present invention. The first and second mold halves can be formed through various techniques, such as injection molding or lathing. Examples of suitable processes for forming the mold halves are disclosed in U.S. Pat. No. 4,444,711 to Schad; U.S. Pat. No. 4,460,534 to Boehm et al.; U.S. Pat. No. 5,843,346 to Morrill; and U.S. Pat. No. 5,894,002 to Boneberger et al., which are also incorporated herein by reference.

Virtually all materials known in the art for making molds can be used to make molds for making contact lenses. For example, polymeric materials, such as polyethylene, polypropylene, polystyrene, PMMA, Topas® COC grade 8007-S10 (clear amorphous copolymer of ethylene and norbornene, from Ticona GmbH of Frankfurt, Germany and Summit, N.J.), or the like can be used. Other materials that allow UV light transmission could be used, such as quartz glass and sapphire.

Any lens-forming materials can be used in the invention and is not presently considered a critical part of this aspect of the invention. Lens forming materials that are suitable in the fabrication of contact lenses are illustrated by numerous issued US patents and familiar to those skilled in the art. Preferred lens-forming materials are capable of forming hydrogels. A lens-forming material can comprise one or more prepolymers, optionally one or more vinylic monomers and/or macromers and optionally further include various components, such as photoinitiator, visibility tinting agent, fillers, and the like. It should be understood that any silicone-containing prepolymers or any silicone-free prepolymers can be used in the present invention.

A preferred group of lens-forming materials are prepolymers which are water-soluble and/or meltable as described above. It would be advantageous that a lens-forming material comprises primarily one or more prepolymers which are preferably in a substantially pure form (e.g., purified by ultrafiltration). Therefore, after crosslinking/polymerizing by actinic radiation, a contact lens may require practically no more subsequent purification, such as complicated extraction of unpolymerized constituents. Furthermore, crosslinking/polymerizing may take place solvent-free or in aqueous solution, so that a subsequent solvent exchange or the hydration step is not necessary.

A person skilled in the art will know well how to actinically or thermally cure the lens-forming material within the lens-forming cavity to form the contact lens.

In a preferred embodiment, where a lens-forming material is a solution, solvent-free liquid, or melt of one or more prepolymers optionally in presence of other components, reusable molds are used and the lens-forming material is cured actinically under a spatial limitation of actinic radiation to form a colored contact lens. Examples of preferred reusable molds are those disclosed in U.S. patent application Ser. No. 08/274,942 filed Jul. 14, 1994, Ser. No. 10/732,566 filed Dec. 10, 2003, Ser. No. 10/721,913 filed Nov. 25, 2003, and U.S. Pat. No. 6,627,124, which are incorporated by reference in their entireties.

In this case, the lens-forming material is put into a mold consisting of two mold halves, the two mold halves not touching each other but having a thin gap of annular design arranged between them. The gap is connected to the mold cavity, so that excess lens material can flow away into the gap. Instead of polypropylene molds that can be used only once, it is possible for reusable quartz, glass, or sapphire molds to be used, since, following the production of a lens, these molds can be cleaned and dried rapidly to effectively remove the uncrosslinked prepolymer and other residues, using water or a suitable solvent. Reusable molds can also be made of Topas® COC grade 8007-S10 (clear amorphous copolymer of ethylene and norbornene) from Ticona GmbH of Frankfurt, Germany and Summit, N.J. Since the mold halves do not touch each other in the region of the lens to be produced, i.e. the cavity or actual mold faces, damage as a result of contact is ruled out. This ensures a high service life of the molds, which, in particular, also ensures high reproducibility of the contact lenses to be produced.

The two opposite surfaces (anterior surface and posterior surface) of a contact lens are defined by the two molding surfaces while the edge is defined by the spatial limitation of actinic irradiation rather than by means of mold walls. Typically, only the lens-forming material within a region bound by the two molding surfaces and the projection of the well defined peripheral boundary of the spatial limitation is crosslinked whereas any lens-forming material outside of and immediately around the peripheral boundary of the spatial limitation is not crosslinked, and thereby the edge of the contact lens should be smooth and precise duplication of the dimension and geometry of the spatial limitation of actinic radiation. Such method of making contact lenses are described in U.S. patent application Ser. No. 08/274,942 filed Jul. 14, 1994, Ser. No. 10/732,566 filed Dec. 10, 2003, Ser. No. 10/721,913 filed Nov. 25, 2003, and U.S. Pat. No. 6,627,124, which are incorporated by reference in their entireties.

A spatial limitation of actinic radiation (or the spatial restriction of energy impingement) can be effected by masking for a mold that is at least partially impermeable to the particular form of energy used, as illustrated in U.S. patent application Ser. No. 08/274,942 filed Jul. 14, 1994 and U.S. Pat. No. 6,627,124 (herein incorporated by reference in their entireties) or by a mold that is highly permeable, at least at one side, to the energy form causing the crosslinking and that has mold parts being impermeable or of poor permeability to the energy, as illustrated in U.S. patent application Ser. No. 10/732,566 filed Dec. 10, 2003, Ser. No. 10/721,913 filed Nov. 25, 2003 and U.S. Pat. No. 6,627,124 (herein incorporated by reference in their entireties). The energy used for the crosslinking is radiation energy, especially UV radiation, gamma radiation, electron radiation or thermal radiation, the radiation energy preferably being in the form of a substantially parallel beam in order on the one hand to achieve good restriction and on the other hand efficient use of the energy.

It should be understood that an ink of the invention should have a good transferability of the colored coat from a mold to a contact lens and a good adhesion to the molded lens. The resultant colored contact lens is essentially smooth and continuous on the surface containing the color film.

The good transferability and adhesion may be resulted largely from interpenetrating network formation during curing of the lens-forming material in the mold. Without limiting this invention to any particular mechanism or theory, it is believed that the ink binders of the invention can form interpenatrating networks (IPN's) with the lens material of a hydrogel lens. Adhesion of an ink of the invention to the lens by IPN formation does not require the presence of reactive funtional groups in the lens polymer. The lens-forming material is crosslinked in the presence of cross-linked binder polymer in the colored film to form IPNs. It is understood that some (residual) ethylenically unsaturated groups in the binder polymer may not be consumed during curing of the colored coat to form the colored film. These residual ethylenically unsaturated groups may undergo crosslinking reaction to bind the binder polymer to the lens material during the curing of the lens-forming material in the mold.

It is also understood that adhesion between lenses and ink could be enhanced by direct linkage (bond formation) between binder polymer and lens polymer. For example, a binder polymer containing nucleophilic groups could undergo reactions with lens polymer that contains electrophilic groups such as epoxy, anhydride, alkyl halide and isocyanate. Alternatively one could bind ink to lenses by having electrophilic groups in the ink binder polymer and nucleophic groups in the lens polymer. Curable inks could also be made be incorporating both nucleophilic and electrophilic functionality into to binder polymer.

In another aspect, the invention encompasses a method for making a colored contact lens, comprising the steps of:

(a) providing a preformed contact lens; and (b) applying a first print pattern of opaque colored dots of a first color onto a surface of at least one of the anterior and posterior surfaces of the contact lens, wherein the first print is an annular ring of gradient dot matrix, (c) applying a second print pattern of opaque colored dot of a second color onto the surface of the contact lens, wherein the second print is an annular ring of speckle pattern, wherein the annular ring of speckle pattern comprises of clusters of irregular speckle shape distributed annularly, wherein the speckle shape consists of a large number of small dots, wherein the annular ring of speckle pattern has non-smooth inner and outer borders, wherein the second print is located on the inside of the first print, wherein the first color and the second color are different or the same, wherein the first print and the second print are concentric with the center of contact lens.

In still another aspect, the invention encompasses a method for making a colored contact lens, comprising the steps of:

(a) providing a mold including a first mold half having a first molding surface defining the anterior surface of a contact lens and a second mold half having a second molding surface defining the posterior surface of the contact lens, wherein the first and second mold halves are configured to receive each other such that a contact lens forming cavity is formed between the first and second molding surfaces;

(b) applying, by using pad-transfer or inkjet printing technique, a second print pattern of opaque colored dot of a second color to onto at least one of molding surfaces of a lens mold, wherein the second print is an annular ring of speckle pattern, wherein the annular ring of speckle pattern comprises of clusters of irregular speckle shape distributed annularly, wherein the speckle shape consists of a large number of small dots, wherein the annular ring of speckle pattern has non-smooth inner and outer borders, and (c) applying, by using pad-transfer or inkjet printing technique, a first print pattern of opaque colored dots of a first color onto the surface of the mold, wherein the first print is an annular ring of gradient dot matrix, wherein the second print is located on the inside of the first print, wherein the first color and the second color are different or the same, wherein the first print and the second print are concentric with the center of contact lens.

Any known suitable lenses made of any lens-forming material can be used to practice this invention. Preferably, hydrogel lenses or silicone-containing hydrogel lenses are used to practice this invention. Examples of preferred lenses include: without limitation, lenses described in Loshaek's U.S. Pat. No. 4,668,240 (incorporated herein by reference in its entirety); lenses prepared from a water-soluble crosslinkable poly (vinyl alcohol) prepolymer as described in U.S. Pat. Nos. 5,583,163 and 6,303,687 (incorporated by reference in their entireties); lenses made from a water-soluble crosslinkable polyurea prepolymer as described in U.S. Pat. No. 6,479,587 (herein incorporated by reference in its entirety) and U.S. patent application No. 60/525,100 filed Nov. 25, 2003 entitled "Crosslinkable polyurea prepolymers" (herein incorporated by reference in its entirety); and the like. It is understood that any commercial available lenses, such as, for example, FOCUS DAILIES®, ACUVUE®, etc., can be used to practice this invention.

Although various embodiments of the invention have been described using specific terms, devices, and methods, such description is for illustrative purposes only. The words used are words of description rather than of limitation. It is to be understood that changes and variations may be made by those skilled in the art without departing from the spirit or scope of the present invention, which is set forth in the following claims. In addition, it should be understood that aspects of the various embodiments may be interchanged either in whole or in part. Therefore, the spirit and scope of the appended claims should not be limited to the description of the preferred versions contained therein.

What is claimed is:

1. A colored contact lens, comprising a first print of a first color and a second print of a second color, wherein the first print is an annular ring of gradient dot matrix, wherein the second print is an annular ring of speckle pattern, wherein an exterior peripheral edge of the first print has a diameter from about 12.5 mm to about 15 mm and the width of the first print is from about 0.8 mm to about 3.5 mm, wherein the annular ring of speckle pattern comprises clusters of regular or irregular shapes distributed annularly, wherein the regular or irregular shapes consists of a large number of circular dots, wherein the annular ring of speckle pattern has non-smooth inner and outer borders, wherein the second print is located on the inside of the first print, wherein the first color and the second color are different or the same, wherein the first print and the second print are concentric with the center of contact lens.

2. The colored contact lens of claim 1, wherein the first print has a color selected from a group consisting of black, gray, brown and blue.

3. The colored contact lens of claim 1, wherein the second print has a color selected from a group consisting of black, gray, brown and blue.

4. The colored contact lens of claim 1, wherein an exterior peripheral edge of the first print has a diameter from about 12.5 mm to about 15 mm and the width of the first print is from about 0.8 mm to about 3.5 mm.

5. The colored contact lens of claim 4, wherein the first print has a width of from about 2.0 mm to about 3.0 mm.

6. The colored contact lens of claim 1, wherein the width of the speckle annular ring pattern is about 30-90% of the width of the annular ring of gradient dot matrix.

7. The colored contact lens of claim 1, wherein the speckle annular ring pattern comprising pearlescently colored, wherein the pearlescently colored element comprises at least one pearlescent pigment in an amount sufficient to provide to the inner starburst pattern of the contact lens a desirable amount of pearlescent to impart a shine appearance to a wearer's eye.

8. The colored contact lens of claim 1, further comprising a third print of a third color, wherein the third print is a first tulip flower ring pattern has a shape comprising two elements, the first element is a vermicular shape having a thicker center and thinner at a first end and a second end; the second element is a mirror image of the first element, the first end of the first element and the first end of the second element are converged to touch each other and the second end of the first element and the second end of the second element are diverged, wherein the tulip flower is repeated annularly around to form a ring with the converged points pointing inwards, wherein the first color, the second color and the third color are different or the same, wherein the first print, the second print and the third print are concentric with the center of contact lens.

9. The colored contact lens of claim 8, wherein the third print has a color selected from a group consisting of blue, gray, black, brown, blue, turquoise, violet, blue-violet, aqua, orange, yellow, hazel and green.

10. The colored contact lens of claim 8, further comprising a fourth print of a fourth color, wherein the fourth print is a second tulip flower ring pattern has a shape comprising two elements, the first element is a vermicular shape having a thicker center and thinner at a first end and a second end; the second element is a mirror image of the first element, the first end of the first element and the first end of the second element are converged to touch each other and the second end of the first element and the second end of the second element are diverged, wherein the tulip flower is repeated annularly around to form a ring with the converged points pointing outwards, wherein the first tulip flower ring pattern annular ring and second tulip flower ring pattern have an identical outer diameter and the second tulip flower ring pattern has a same or a smaller inner diameter than that of the first tulip flower ring pattern, wherein the first color, the second color, the third color and the fourth color are different or the same, wherein the first print, the second print, the third print and the fourth print are concentric with the center of contact lens.

11. The colored contact lens of claim 10, wherein the fourth print has a color selected from a group consisting of blue, gray, black, brown, blue, turquoise, violet, blue-violet, aqua, orange, yellow, hazel and green.

12. The colored contact lens of claim 9, wherein the second tulip flower ring pattern has a smaller inner diameter than that of the first tulip flower ring pattern.

13. A method for making a colored contact lens, comprising the steps of:
(a) providing a preformed contact lens; and
(b) applying a first print pattern of opaque colored dots of a first color onto a surface of at least one of the anterior and posterior surfaces of the contact lens, wherein the first print is an annular ring of gradient dot matrix,
(c) applying a second print pattern of opaque colored dot of a second color onto the surface of the contact lens, wherein the second print is an annular ring of speckle pattern, wherein the annular ring of speckle pattern comprises clusters of regular or irregular shapes distributed annularly, wherein the regular or irregular shapes consists of a large number of circular dots, wherein the annular ring of speckle pattern has non-smooth inner and outer borders, wherein the second print is located on the inside of the first print, wherein the first color and the second color are different or the same, wherein the first print and the second print are concentric with the center of contact lens.

14. A method for making a colored contact lens, comprising the steps of:
(a) providing a mold including a first mold half having a first molding surface defining the anterior surface of a contact lens and a second mold half having a second molding surface defining the posterior surface of the contact lens, wherein the first and second mold halves are configured to receive each other such that a contact lens forming cavity is formed between the first and second molding surfaces;
(b) applying, by using pad-transfer or inkjet printing technique, a second print pattern of opaque colored dot of a second color to onto at least one of molding surfaces of a lens mold, wherein the second print is an annular ring of speckle pattern, wherein the annular ring of speckle pattern comprises clusters of regular or irregular shapes distributed annularly, wherein the regular or irregular shapes consists of a large number of circular dots, wherein the annular ring of speckle pattern has non-smooth inner and outer borders, and
(c) applying, by using pad-transfer or inkjet printing technique, a first print pattern of opaque colored dots of a first color onto the surface of the mold, wherein the first print is an annular ring of gradient dot matrix, wherein the second print is located on the inside of the first print, wherein the first color and the second color are different or the same, wherein the first print and the second print are concentric with the center of contact lens.

* * * * *